Feb. 14, 1956 H. O. PETERSON 2,735,003

RECEIVER FOR MULTIPLEX SIGNALS

Filed Aug. 27, 1952 2 Sheets-Sheet 1

INVENTOR.
Harold O. Peterson

BY Charles H. Brown
ATTORNEY

Feb. 14, 1956 H. O. PETERSON 2,735,003

RECEIVER FOR MULTIPLEX SIGNALS

Filed Aug. 27, 1952 2 Sheets-Sheet 2

INVENTOR.
Harold O. Peterson

BY Charles H. Brown
ATTORNEY 2,735,003
Patented Feb. 14, 1956

2,735,003

RECEIVER FOR MULTIPLEX SIGNALS

Harold Olaf Peterson, Riverhead, N. Y., assignor to Radio Corporation of America, a corporation of Delaware Application August 27, 1952, Serial No. 306,618
13 Claims. (Cl. 250—20)

This invention relates to a diversity receiver, and more particularly to a diversity receiver applicable to the reception of multiplex signals.

In one form of multiplex transmission, known as "moduplex," a carrier at a transmitting station is simultaneously amplitude modulated by the signal in a first multiplex channel and frequency shift keyed by the signal in a second multiplex channel. The modulating signal in the first or amplitude modulation channel may be either a telephone signal or a tone signal; if it is the latter, it can be on/off keyed to transmit telegraphic characters. It will be assumed, for purposes of illustration, that both of the transmitted multiplex signals to be received by the receiving arrangement of this invention are telegraphic in nature, one signal being transmitted by on/off keying of a tone which is thus caused to amplitude modulate the transmitted carrier, and the other signal being transmitted by frequency shift keying of the carrier.

An object of this invention is to provide a form of diversity receiver that is particularly suitable for receiving a multiplex signal provided by amplitude modulation and frequency shift keying of a carrier.

Another object is to devise a diversity receiver for an amplitude modulated and frequency shift keyed carrier in which interaction between the two modes of modulation is minimized.

A further object is to provide a diversity receiver for an amplitude modulated and frequency shift keyed carrier, in which a combination of frequency diversity and space diversity is obtained at the receiver.

The objects of this invention are accomplished, briefly, in the following manner: The transmitted amplitude modulated and frequency shift keyed carrier wave of radio frequency is received on two spaced antennas feeding two separate receivers and converters in each of which the respective signal version is heterodyned down to an average frequency of, for example, 450 kc., which is in the intermediate frequency range. In each diversity receiving channel, further heterodyning down takes place, to bring the signal versions down to intermediate frequency signals in the vicinity of, for example, 50 kc. By suitable filters, in each diversity channel the upper amplitude modulation (AM) sideband, the lower AM sideband and the carrier are separated each from the others. The two diversified carriers are rectified, combined and the combined voltage is used as an AGC voltage for the amplifiers of the two diversity channels. The two diversified carriers, which carry the frequency shift keyed (FSK) signal, are applied to the input of a more or less conventional FSK receiving circuit, wherein the two signals are compared and the stronger signal selected and passed on to a common output circuit for operation of a tone keyer the output of which is transmitted to the central office. In this way, one of the two transmitted multiplex signals is received in diversified fashion and utilized. The upper and lower sidebands which are separated out in each diversity channel are individually rectified and applied to a common load resistor the voltage across which operates a tone keyer the output of which is also transmitted to the central office. These upper and lower AM sidebands carry the AM signal; thus, the other of the two transmitted multiplex (duplex) signals is received in diversified fashion and utilized.

The aforementioned objects and other objects of the invention will be best understood from the following description of some exemplifications thereof, reference being had to the accompanying drawing, wherein.

Figure 1:
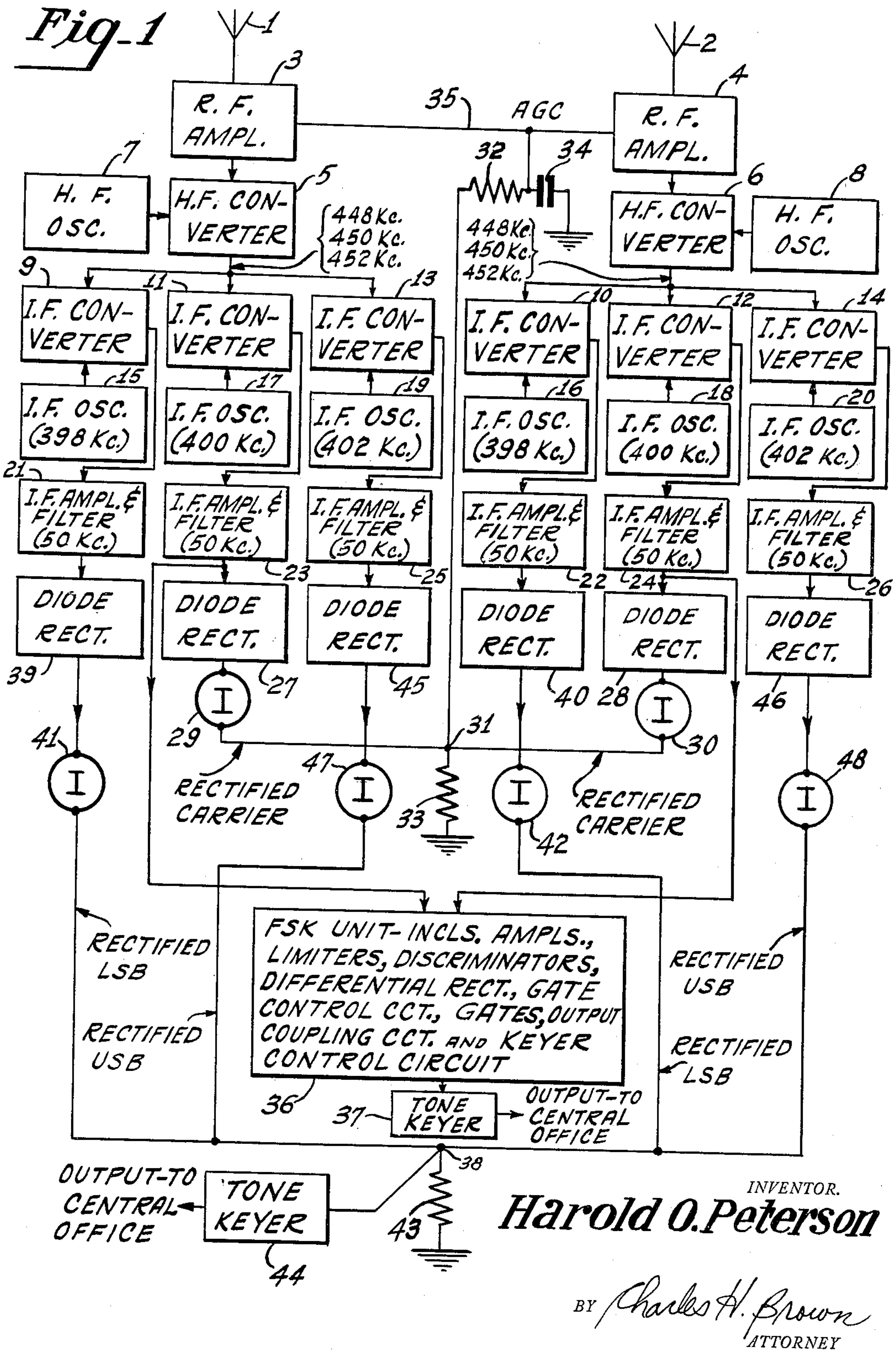
Figure 1 is a block diagram of an arrangement according to this invention.

Referring now to Fig. 1, two antennas or radiant energy pickups 1 and 2, spaced from each other a distance sufficient to be in space diversity or diversified relation with respect to a remote transmitter, pick up two different versions of the transmitted signal and feed them to respective radio frequency amplifiers 3 and 4. At the transmitter, two telegraph signals are transmitted in multiplex on a common carrier, of the order of 20 megacycles mean frequency, for example, by simultaneously amplitude modulating and frequency shift keying such carrier, one of the telegraph signals being transmitted by frequency shift keying of the carrier, and the other by on/off keying of a tone which is caused to amplitude modulate the carrier. As an example, it may be assumed that the FSK signal produces a carrier frequency shift of 600 cycles in the process of frequency shift keying and also that a tone frequency of 2 kc. is used for the AM tone telegraph signal. This will result in on/off keyed sidebands situated at frequencies 2 kc. below the carrier frequency. When the carrier frequency shifts 600 cycles due to the frequency shift keying, each of these sidebands also shifts 600 cycles. This simultaneous AM and FSK carrier is the type of signal to be received by the diversity receiver of this invention.

In order to minimize mutual interference between the multiplex channels, it is preferred that the keying wave shapes be rounded ahead of the transmitter modulators, so that unnecessary keying sidebands are not produced. Thus, at the transmitter, the keyed D. C. tone is preferably passed through a band pass filter having a bandwidth about six times the keying frequency, and the D. C. telegraph signal feeding the control grid of the FSK reactance tube is preferably passed through a low pass filter having a cutoff frequency equal to about three times the keying frequency.

The outputs of amplifiers 3 and 4 are fed to respective high frequency converters 5 and 6, which are also supplied with heterodyning energy from respective high frequency oscillators 7 and 8. The oscillators 7 and 8 both have a frequency of either 450 kc. above or 450 kc. below the average frequency of the received carrier, which results in the production of the three component frequencies 448 kc., 450 kc. and 452 kc. in the output of converters 5 and 6. The 448-kc. frequency corresponds to the lower sideband of the on/off keyed amplitude modulation, the 450-kc. frequency corresponds to the carrier of this amplitude modulation (which is frequency shifted by the FSK signal) and the 452-kc. frequency corresponds to the upper sideband of the on/off keyed amplitude modulation.

The output of converter 5 is fed to three separate intermediate frequency converters 9, 11 and 13, which are also supplied with heterodyning energy from respective intermediate frequency oscillators 15, 17 and 19 as indicated, oscillator 15 having a frequency of 398 kc., oscillator 17 a frequency of 400 kc. and oscillator 19 a frequency of 402 kc. Thus, it is possible to produce a difference frequency of 50 kc. in the output of each of the converters 9, 11 and 13, the 398-kc. frequency of oscillator 15 beating with the 448-kc. lower sideband frequency to give 50 kc., the 400-kc. frequency of oscillator 17 beating with the 450-kc. carrier frequency to give 50 kc. and the 402-kc. frequency of oscillator 19 beating with the 452-kc. upper sideband frequency to give 50 kc. Similarly, the output of converter 6 is fed to three separate intermediate frequency converters 10, 12 and 14, also supplied with heterodyning energy from respective intermediate frequency oscillators 16, 18 and 20 having the frequencies indicated. The 398-kc. frequency of oscillator 16 beats with the 448-kc. lower sideband frequency to give 50 kc., the 400-kc. frequency of oscillator 18 beats with the 450-kc. carrier frequency to give 50 kc., while the 402-kc. frequency of oscillator 20 beats with the 452-kc. upper sideband frequency to give 50 kc.

The upper and lower sideband versions in the first diversity receiver are separated from each other, and from the carrier, by applying the outputs of converters 9, 11 and 13 to respective intermediate frequency amplifiers and filters 21, 23 and 25, the filters in these latter units having mid-band frequencies of 50 kc. Since the upper and lower sideband frequencies shift 600 cycles when the carrier or average frequency shifts 600 cycles in response to the frequency shift keying, filters with bandwidths of about 1 kc. are used for each sideband and the carrier, respectively. Since 50-kc. signal in the output of converter 9 results from the lower sideband frequency, the output of unit 21 is the lower sideband which is thus selected by the filter in this latter unit. Since 50-kc. signal in the output of converter 11 results from the carrier, the output of unit 23 is the carrier which is thus selected by the filter in this latter unit. Since 50-kc. signal in the output of converter 13 results from the upper sideband frequency, the output of unit 25 is the upper sideband which is thus selected by the filter in this latter unit. Likewise, the upper and lower sideband versions in the second diversity receiver are separated from each other, and from the carrier, by applying the 50-kc. outputs of converters 10, 12 and 14 to respective intermediate frequency amplifiers and filters 22, 24 and 26, the filters in these latter units having mid-band frequencies of 50 kc. and bandwidths of about 1 kc. The output of unit 22 is the lower sideband, the output of unit 24 is the carrier and the output of unit 26 is the upper sideband. In the receiver of this invention, interaction between the two modes of modulation is minimized by separating the carrier, the upper sideband and the lower sideband by means of selective filters in the manner described.

The carrier, which is to be understood as being the FSK branch or multiplex channel and as carrying the FSK intelligence or telegraph signal, is rectified and used for commoned automatic gain control (AGC). The output of unit 23, which is one version of the carrier, is applied to a diode rectifier 27 and the rectified output is applied through a current-indicating instrument 29, for example a milliammeter, to the point 31, from which a load resistor 33 is connected to ground. The output of unit 24, which is the other version of the carrier, is applied to a diode rectifier 28 and the rectified output is applied through a current-indicating instrument 30, such as a milliammeter, to a point 31 for combination or commoning with the rectified carrier version of the other diversity receiver. The AGC potential appearing at point 31 is filtered by a resistor 32 and a capacitor 34 and applied to an AGC lead 35 which is coupled to gain-controlling electrodes in both amplifiers 3 and 4, in the usual manner. In this way, the two rectified carrier versions are used for commoned AGC, controlling the gains of the amplifiers 3 and 4 in the two diversity receivers. Thus, in effect the FSK branch, separated out, is used to control the gains of the two receivers.

The separated-out carrier signal versions are applied to the input of an FSK unit 36 for utilization of the FSK signal intelligence. More particularly, the outputs of units 23 and 24 are both applied to the FSK unit 36. This latter unit is preferably arranged as disclosed in Schock et al. Patent #2,515,668, dated July 18, 1950. Then, unit 36 may include an amplifier followed by a limiter, a discriminator and a gate for each of the two input signals from units 23 and 24. Each input signal to unit 36 is amplified, limited and then applied to its discriminator-detector to produce a pulsating-amplitude-waveform signal representative of the keying of the FSK telegraph signal, which is applied to its respective gate. The strengths of the two input signals are compared by a differential rectifier circuit in unit 36 and the output of this rectifier controls the two gates, by means of a gate control circuit in this same unit, to open the gate coupled to the stronger discriminator output and to close the other gate, to thereby allow only this stronger output to pass to an output coupling circuit and a keyer control circuit which are both common to the two gates. The keyer control circuit output controls or operates a tone keyer 37 to produce a tone output, keyed in accordance with the transmitted FSK telegraph signal, which is the signal in one multiplex channel. The keyed tone output of tone keyer 37 is transmitted to the telegraph central office, which may be at another point.

In the above-described manner, the FSK signal is separated out from the received composite or multiplex signal, and is utilized. It will be noted that the FSK signal component is separated out in units 23 and 24, ahead of the diversity switching and utilization circuits in units 36 and 37.

The lower and upper sidebands, which in the example given are located 2 kc. below and above the carrier frequency (the tone frequency being of 2 kc. and being amplitude modulated onto the carrier by on/off keying), are selected in filters 21 and 25, respectively, in one diversity receiver and in filters 22 and 26, respectively, in the other diversity receiver, as previously explained. The lower sideband output of unit 21 in the first receiver is rectified in a diode rectifier 39 coupled to such output and the rectified lower sideband output is applied through a current-indicating instrument 41, for example, a milliammeter, to the point 38, from which a commoned load resistor 43 is connected to ground. The upper sideband output of unit 25 in the first receiver is rectified in a diode rectifier 45 coupled to such output and the rectified upper sideband output is applied through a current-indicating instrument 47 to point 38 and the load resistor 43. The lower sideband output of unit 22 in the second receiver is rectified in a diode rectifier 40 coupled to such output and the rectified lower sideband output is applied through a current-indicating instrument 42 to point 38 and the load resistor 43. The upper sideband output of unit 26 in the second receiver is rectified in a diode rectifier 46 coupled to such output and the rectified upper sideband output is applied through a current-indicating instrument 48 to point 38 and the load resistor 43.

By the above arrangement, the upper and lower sidebands from each of the two diversity receivers after rectification are combined in the common load resistor 43. The current from the strongest one of these four branches, flowing through resistor 43, produces a voltage which appears as a rectifier bias in all four branches and tends to prevent the flow of rectified current in those branches which have less alternating current input to the rectifiers.

The voltage produced across the resistor 43, resulting from the flow therethrough of current representative of the rectified upper and lower sidebands, controls or operates a tone keyer 44 to produce a tone output, keyed in accordance with the transmitted on/off AM tone telegraph signal, which is the signal in one multiplex channel. The keyed tone output of tone keyer 44 is transmitted to the telegraph central office, which again might be at a point remote from the receiver illustrated in Fig. 1.

In the manner described the AM tone telegraph signal is separated out from the received composite or multiplex signal, and is utilized. It will be noted that the AM signal component is separated out in units 21, 22, 25 and 26, ahead of the diversity combining and utilization circuits 43, 44.

It will be noted that in the receiver of this invention the upper and lower sidebands are separated from each other in each receiver and used separately, that is, as separate versions of the received signal. Since these two sidebands have different frequencies, frequency diversity is provided for the AM signal, in addition to or in combination with the space diversity which naturally results from the spaced relation of the two receiving antennas 1 and 2. Separation of the component upper sideband and lower sideband frequencies in the manner disclosed in Fig. 1 gives better diversity action (as a result of frequency diversity) than a system in which the on/off keyed (AM) sidebands are received in a conventional telephone receiver.

In Fig. 1, the 400-kc. I. F. oscillators of two of the three I. F. units associated with each receiver are detuned, so as to receive the upper and the lower sidebands, as well as the carrier, in I. F. filters having mid-band frequencies of 50 kc., such filters being the filters in units 21–26, inclusive. To be more specific, in one receiver the two oscillators 15 and 19 are detuned from 400 kc., the oscillator 15 being tuned to 398 kc. to separate out the lower sideband and the oscillator 19 being tuned to 402 kc. to separate out the upper sideband; in the other receiver the two oscillators 16 and 20 are detuned from 400 kc., the oscillator 16 being tuned to 398 kc. to separate out the lower sideband and the oscillator 20 being tuned to 402 kc. to separate out the upper sideband.

Figure 2:
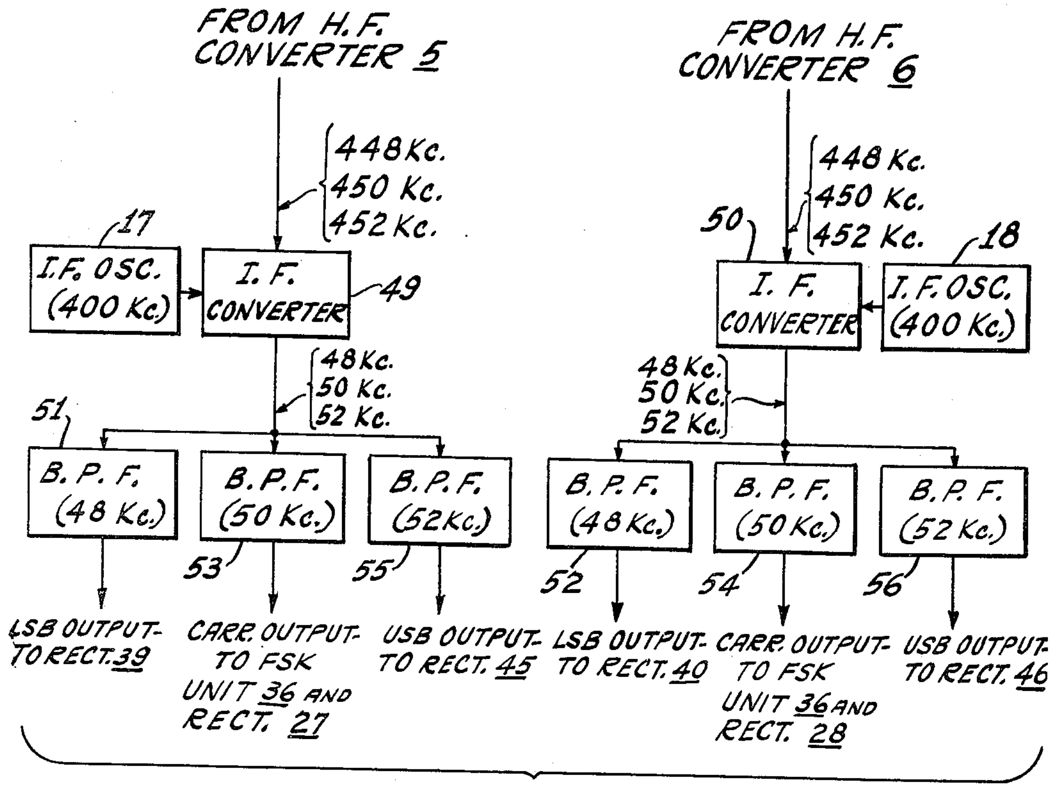
Fig. 2 is a partial block diagram of a modification.

Alternatively, only one I. F. converter and 400 kc. oscillator could be used for each receiver, with the converter feeding bandpass filters with mid-band frequencies of 48 kc., 50 kc. and 52 kc., to select the lower sideband, the carrier and the upper sideband, respectively. Such an alternative arrangement is illustrated in Fig. 2, to which reference will now be made.

The output of the high frequency converter 5, having upper and lower sideband and carrier frequencies of 452, 448 and 450 kc., respectively, is fed to an I. F. converter 49, to which is also fed I. F. energy at a frequency of 400 kc. from I. F. oscillator 17. The converter 49 is tuned broadly enough to accept the frequencies of 448 kc., 450 kc. and 452 kc. at its input and to supply all the difference frequencies of 48 kc., 50 kc. and 52 kc. at its output. The output of converter 49 feeds three bandpass filters 51, 53 and 55 having mid-band frequencies of 48 kc., 50 kc. and 52 kc., respectively, and each having a bandwidth of about 1 kc. Since the 48-kc. output signal of converter 49 corresponds to the lower sideband of the received signal, it may be seen that bandpass filter 51 selects the lower sideband and the lower sideband output of filter 51 is passed on to diode rectifier 39 as in Fig. 1. Since the 50-kc. output signal of converter 49 corresponds to the received carrier, it may be seen that bandpass filter 53 selects the carrier and the carrier output of filter 53 is passed on to FSK unit 36 as in Fig. 1 and also to diode rectifier 27 for AGC purposes. Since the 52-kc. output signal of converter 49 corresponds to the upper sideband of the received signal, it may be seen that bandpass filter 55 selects the upper sideband and the upper sideband output of filter 55 is passed on to diode rectifier 45 as in Fig. 1.

The units mentioned in the preceding paragraph are those in a single one of the receivers and are duplicated in the other of the two receivers making up the two-set diversity receiving arrangement. Thus, the output of the high frequency converter 6, having upper and lower side band and carrier frequencies of 452, 448 and 450 kc., respectively, is fed to an I. F. converter 50, to which is also fed I. F. energy at 400 kc. from oscillator 18. The converter 50 is tuned as broadly as converter 49. The output of converter 50 feeds three bandpass filters 52, 54 and 56 having mid-band frequencies of 48 kc., 50 kc. and 52 kc., respectively and each having a bandwidth of about 1 kc. Since the 48-kc. output signal of converter 50 corresponds to the lower sideband of the received signal, it may be seen that bandpass filter 52 selects the lower side band and the lower sideband output of filter 52 is passed on to diode rectifier 40 as in Fig. 1. Since the 50-kc. output signal of converter 50 corresponds to the received carrier, it may be seen that bandpass filter 54 selects the carrier and the carrier output of filter 54 is passed on to FSK unit 36 as in Fig. 1 and also to diode rectifier 28 for AGC purposes. Since the 52-kc. output signal of converter 50 corresponds to the upper sideband of the received signal, it may be seen that bandpass filter 56 selects the upper sideband and the upper sideband output of filter 56 is passed on to diode rectifier 46 as in Fig. 1.

What is claimed is:

1. In a receiver for a transmitted multiplex signal consisting of a carrier that is amplitude modulated by one signal and frequency shift keyed by another signal, means for separating the upper and lower amplitude modulation sidebands of the received signal from each other and from the carrier, means for applying the separated carrier to a frequency shift keying receiving circuit for utilization of said other signal, and means for effecting diversity combination of the upper and lower sidebands in a common output circuit for utilization of said one signal.

2. In a receiver for a transmitted multiplex signal consisting of a carrier that is amplitude modulated by one signal and frequency shift keyed by another signal, a controllable-gain amplifier for the received signal, means coupled to the output of said amplifier for separating out the carrier from the received signal, means for rectifying a portion of the separated carrier, means for applying the rectified voltage as an automatic gain control potential to said amplifier, means for applying the remaining portion of the separated carrier to a frequency shift keying receiving circuit for utilization of said other signal, means for separating the amplitude modulation signal component from the received signal, and means for utilizing said signal component.

3. In a receiver for a transmitted multiplex signal consisting of a carrier that is amplitude modulated by one signal and frequency shift keyed by another signal, a controllable-gain amplifier for the received signal, means coupled to the output of said amplifier for separating the upper and lower amplitude modulation sidebands of the received amplified signal from each other and from the carrier, means for rectifying a portion of the separated carrier, means for applying the rectified voltage as an automatic gain control potential to said amplifier, means for applying the remaining portion of the separated carrier to a frequency shift keying receiving circuit for utilization of said other signal, and means for effecting diversity combination of the upper and lower sidebands in a common output circuit for utilization of said one signal.

4. In a diversity receiver for a transmitted multiplex signal consisting of a carrier that is amplitude modulated by one signal and frequency shift keyed by another signal, a pair of radiant energy pickups arranged in diversified relation with respect to a remote transmitter, to thereby pick up different versions of the transmitted signal, means coupled to each pickup for separating out the carrier from each respective signal version, means for effecting diversity combination of the two carrier versions in a common output circuit for utilization of said other signal, means coupled to each pickup for separating the amplitude modulation signal component from each respective signal version, and means for effecting diversity combination of the two amplitude modulation signal component versions in a common output circuit for utilization of said one signal.

5. In a diversity receiver for a transmitted multiplex signal consisting of a carrier that is amplitude modulated by one signal and frequency shift keyed by another signal, a pair of radiant energy pickups arranged in diversified relation with respect to a remote transmitter, to thereby pick up different versions of the transmitted signal, means coupled to each pickup for separating out the carrier from each respective signal version, means for effecting diversity combination of the two carrier versions in a common output circuit for utilization of said other signal, means coupled to each pickup for separating the upper and lower amplitude modulation sidebands from each respective signal version, and means for effecting diversity combination of the upper and lower sidebands of both signal versions in a common output circuit for utilization of said one signal.

6. In a diversity receiver for a transmitted multiplex signal consisting of a carrier that is amplitude modulated by one signal and frequency shift keyed by another signal, a pair of radiant energy pickups arranged in diversified relation with respect to a remote transmitter, to thereby pick up different versions of the transmitted signal, a controllable-gain amplifier coupled to each pickup, means coupled to the output of each amplifier for separating out the carrier from each respective signal version, means for rectifying a portion of each carrier version, means for combining the two rectified voltages and for applying them as an automatic gain control potential to the two amplifiers, means for effecting diversity combination of the remaining portions of the two carrier versions in a common output circuit for utilization of said other signal, means coupled to the output of each amplifier for separating the amplitude modulation signal component from each respective signal version, and means for effecting diversity combination of the two amplitude modulation signal component versions in a common output circuit for utilization of said one signal.

7. In a diversity receiver for a transmitted multiplex signal consisting of a carrier that is amplitude modulated by one signal and frequency shift keyed by another signal, a pair of radiant energy pickups arranged in diversified relation with respect to a remote transmitter, to thereby pick up different versions of the transmitted signal, a controllable-gain amplifier coupled to each pickup, means coupled to the output of each amplifier for separating out the carrier from each respective signal version, means for rectifying a portion of each carrier version, means for combining the two rectified voltages and for applying them as an automatic gain control potential to the two amplifiers, means for effecting diversity combination of the remaining portions of the two carrier versions in a common output circuit for utilization of said other signal, means coupled to the output of each amplifier for separating the upper and lower amplitude modulation sidebands from each respective signal version, and means for effecting diversity combination of the upper and lower sidebands of both signal versions in a common output circuit for utilization of said one signal.

8. In a receiver for a transmitted multiplex signal consisting of a carrier that is amplitude modulated by one signal and frequency shift keyed by another signal, means for separating the upper and lower amplitude modulation sidebands of the received signal from each other and from the carrier, means for applying the separated carrier to a frequency shift keying receiving circuit for utilization of said other signal, means for separately rectifying the upper and lower sidebands, and means for combining the rectified upper and lower sidebands in the same load for utilization of said one signal.

9. In a diversity receiver for a transmitted multiplex signal consisting of a carrier that is amplitude modulated by one signal and frequency shift keyed by another signal, a pair of radiant energy pickups arranged in diversified relation with respect to a remote transmitter, to thereby pick up different versions of the transmitted signal, means coupled to each pickup for separating out the carrier from each respective signal version, means for comparing the strengths of the two carrier versions and for coupling only the stronger thereof to a common output circuit for utilization of said other signal, means coupled to each pickup for separating the amplitude modulation signal component from each respective signal version, and means for effecting diversity combination of the two amplitude modulation signal component versions in a common output circuit for utilization of said one signal.

10. In a diversity receiver for a transmitted multiplex signal consisting of a carrier that is amplitude modulated by one signal and frequency shift keyed by another signal, a pair of radiant energy pickups arranged in diversified relation with respect to a remote transmitter, to thereby pick up different versions of the transmitted signal, means coupled to each pickup for separating out the carrier from each respective signal version, means for effecting diversity combination of the two carrier versions in a common output circuit for utilization of said other signal, means coupled to each pickup for separating the upper and lower amplitude modulation sidebands from each respective signal version, means for separately rectifying the upper and lower sidebands of both signal versions, and means for combining the rectified upper and lower sidebands of both signal versions in a common load for utilization of said one signal.

11. In a diversity receiver for a transmitted multiplex signal consisting of a carrier that is amplitude modulated by one signal and frequency shift keyed by another signal, a pair of radiant energy pickups arranged in diversified relation with respect to a remote transmitter, to thereby pick up different versions of the transmitted signal, means coupled to each pickup for separating out the carrier from each respective signal version, means for comparing the strengths of the two carrier versions and for coupling only the stronger thereof to a common output circuit for utilization of said other signal, means coupled to each pickup for separating the upper and lower amplitude modulation sidebands from each respective signal version, means for separately rectifying the upper and lower sidebands of both signal versions, and means for combining the rectified upper and lower sidebands of both signal versions in a common load for utilization of said one signal.

12. In a diversity receiver for a transmitted multiplex signal consisting of a carrier that it amplitude modulated by one signal and frequency shift keyed by another signal, a pair of radiant energy pickups arranged in diversified relation with respect to a remote transmitter, to thereby pick up different versions of the transmitted signal, a controllable-gain amplifier coupled to each pickup, means coupled to the output of each amplifier for separating out the carrier from each respective signal version, means for rectifying a portion of each carrier version, means for combining the two rectified voltages and for applying them as an automatic gain control potential to the two amplifiers, means for comparing the strengths of the remaining portions of the two carrier versions and for coupling only the stronger thereof to a common output circuit for utilization of said other signal, means coupled to the output of each amplifier for separating the amplitude modulation signal component from each respective signal version, and means for effecting diversity combination of the two amplitude modulation signal component versions in a common output circuit for utilization of said one signal.

13. In a diversity receiver for a transmitted multiplex signal consisting of a carrier that is amplitude modulated by one signal and frequency shift keyed by another signal, a pair of radiant energy pickups arranged in diversified relation with respect to a remote transmitter to thereby pick up different versions of the transmitted signal, a controllable-gain amplifier coupled to each pickup, means coupled to the output of each amplifier for separating out the carrier from each respective signal version, means for rectifying a portion of each carrier version, means for combining the two rectified voltages and for applying them as an automatic gain control potential to the two amplifiers, means for comparing the strengths of the remaining portions of the two carrier versions and for coupling only the stronger thereof to a common output circuit for utilization of said other signal, means coupled to the output of each amplifier for separating the upper and lower amplitude modulation sidebands from each respective signal version, means for separately rectifying the upper and lower sidebands of both signal versions, and means for combining the rectified upper and lower sidebands of both signal versions in a common load for utilization of said one signal.

References Cited in the file of this patent

UNITED STATES PATENTS

| | | |
|---|---|---|
| 2,397,913 | Bernstein | Apr. 9, 1946 |
| 2,504,341 | Matthews | Apr. 18, 1950 |
| 2,515,668 | Schock et al. | July 18, 1950 |